(12) United States Patent
Manchester

(10) Patent No.: US 7,626,598 B2
(45) Date of Patent: Dec. 1, 2009

(54) SELF-ORIENTING DISPLAY

(75) Inventor: Scott Manchester, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 307 days.

(21) Appl. No.: 10/987,859

(22) Filed: Nov. 12, 2004

(65) Prior Publication Data

US 2005/0156882 A1    Jul. 21, 2005

Related U.S. Application Data

(63) Continuation of application No. 10/412,042, filed on Apr. 11, 2003.

(51) Int. Cl.
G09G 5/00    (2006.01)

(52) U.S. Cl. ..................................... 345/659

(58) Field of Classification Search ................ 345/619, 345/629–640, 649, 659
See application file for complete search history.

(56) References Cited

U.S. PATENT DOCUMENTS

| | | | |
|---|---|---|---|
| 5,661,632 A | 8/1997 | Register | |
| 6,115,025 A * | 9/2000 | Buxton et al. ............... | 345/659 |
| 6,148,149 A | 11/2000 | Kagle ......................... | 396/50 |
| 6,256,019 B1 | 7/2001 | Allport ....................... | 345/169 |
| 6,326,978 B1 | 12/2001 | Robbins | |
| 6,567,101 B1 | 5/2003 | Thomas | |
| 6,721,738 B2 | 4/2004 | Verplaetse et al. ........... | 707/6 |
| 6,798,429 B2 | 9/2004 | Bradski | |
| 7,161,618 B1 | 1/2007 | Niikawa et al. | |
| 2001/0035845 A1* | 11/2001 | Zwern ......................... | 345/8 |
| 2002/0091762 A1 | 7/2002 | Sohn et al. | |
| 2002/0091763 A1 | 7/2002 | Shah et al. | |
| 2002/0140675 A1 | 10/2002 | Ali et al. | |
| 2004/0212597 A1 | 10/2004 | Nuovo et al. | |
| 2004/0257341 A1 | 12/2004 | Bear et al. | |

OTHER PUBLICATIONS

K. Hinckley, J. Pierce, M. Sinclair, E. Horvitz. "Sensing Techniques for Mobile Interaction." UIST 2000, CHI Letters, vol. 2, 2: pp. 91-100.*

Hinckley, K. et al., "Sensing Techniques for Mobile Interaction", *ACM UIST*, 2000, *Symposium on User Interface Software and Technology*, 2(2), 91-100.

Strietelmeier, J., "Official Gadgeteer Hands on Review:Casio E-100", May 23, 1999, www.the-gadgeteer.com/e100-review.html, 7 pages.

(Continued)

*Primary Examiner*—Ryan R Yang
(74) *Attorney, Agent, or Firm*—Woodcock Washburn LLP

(57) ABSTRACT

A self-orienting display senses the characteristics of an object and automatically rotates and reformats a display image in accordance with those characteristics. In one embodiment, the object is the display device, such as a hand held device, that provides the display image. And as the display device is rotated, the display image is continuously rotated until the device is positioned back to its previous orientation. Characteristics may be sensed by mechanical sensors, electrical sensors, optical sensors, acoustic sensors, gyroscopic sensors, or a combination thereof. Sensors may be positioned on the display device, a person, or a combination thereof. The display images may include graphic display images, textual display images, videos display images, and functional control buttons (e.g., functional displayed representations of control buttons such as play, rewind, stop, scroll). The self-orienting display may also include an authenticator that authenticates a user.

35 Claims, 11 Drawing Sheets

OTHER PUBLICATIONS

In the United States Patent and Trademark Office, Final Office Action in re:. U.S. Appl. No:. 10/412,042, Filed Apr. 11, 2003, Dated Jun. 15, 2009, 34 pages.

In the United States Patent and Trademark Office, Non-Final Office Action in re:. U.S. Appl. No. 10/412,042, Filed Apr. 11, 2003, Dated Feb. 17, 2009, 30 pages.

In the United States Patent and Trademark Office, Final Office Action in re:. U.S. Appl. No. 10/412,042, Filed Apr. 11, 2003, Dated Aug. 28, 2008, 31 pages.

In the United States Patent and Trademark Office, Non-Final Office Action in re:. U.S. Appl. No. 10/412,042, Filed Apr. 11, 2003, Dated Feb. 14, 2008, 31 pages.

In the United States Patent and Trademark Office, Final Office Action in re:. U.S. Appl. No. 10/412,042, Filed Apr. 11, 2003, Dated Apr. 23, 2007, 30 pages.

In the United States Patent and Trademark Office, Final Office Action in re:. U.S. Appl. No. 10/412,042, Filed Apr. 11, 2003, Dated Apr. 23, 2007, 31 pages.

In the United States Patent and Trademark Office, Non-Final Office Action in re:. U.S. Appl. No. 10/412,042, Filed Apr. 11, 2003, Dated Nov. 17, 2006, 31 pages.

In the United States Patent and Trademark Office, Final Office Action in re:. U.S. Appl. No. 10/412,042, Filed Apr. 11, 2003, Dated Jul. 26, 2006, 31 pages.

In the United States Patent and Trademark Office, Non-Final Office Action in re:. U.S. Appl. No. 10/412,042, Filed Apr. 11, 2003, Dated Dec. 13, 2005, 33 pages.

In the United States Patent and Trademark Office, Final Office Action in re:. U.S. Appl. No. 10/412,042, Filed Apr. 11, 2003, Dated Apr. 7, 2005, 27 pages.

* cited by examiner

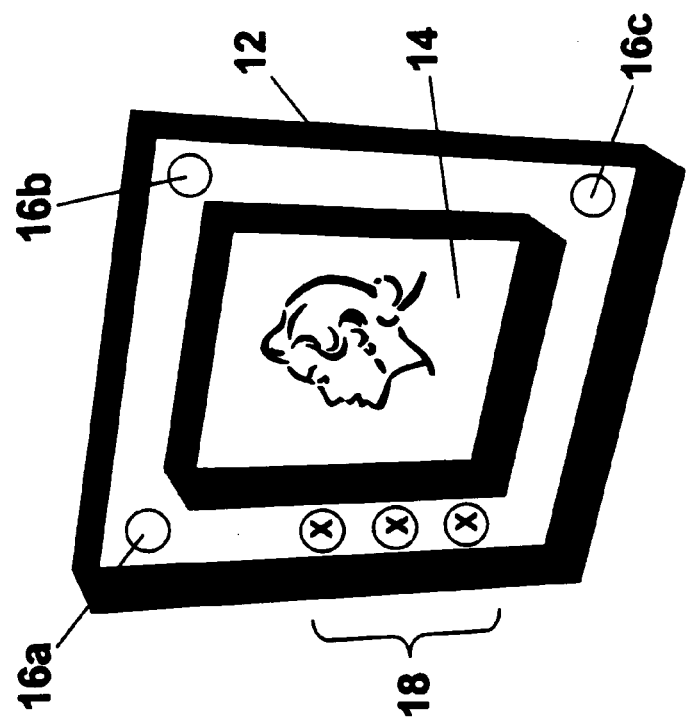
FIGURE 8

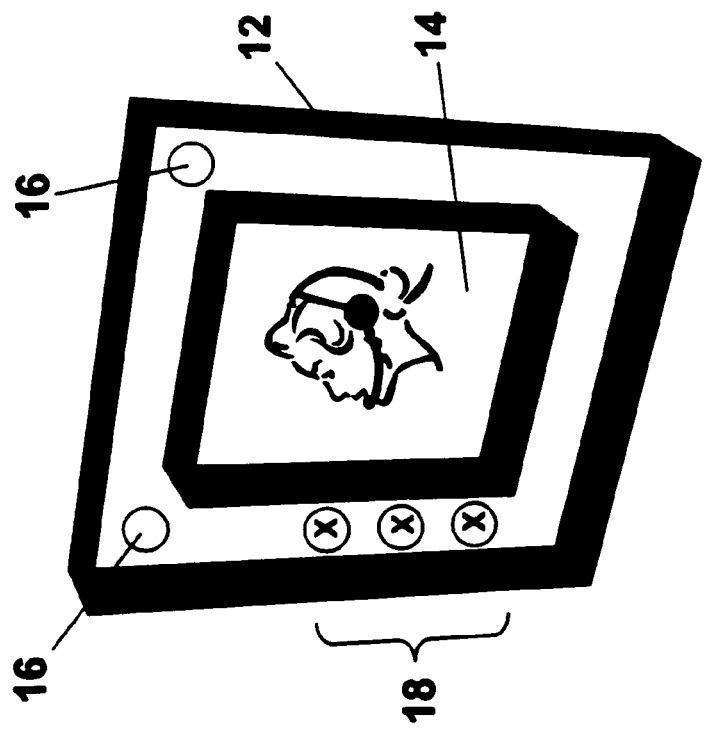
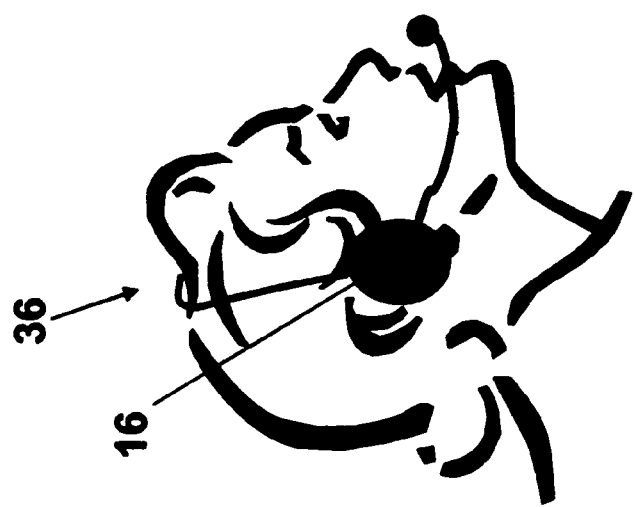
FIGURE 9

SELF-ORIENTING DISPLAY

CROSS-REFERENCE TO RELATED APPLICATIONS

This application is a continuation of U.S. patent application Ser. No. 10/412,042, filed Apr. 11, 2003, and entitled "SELF-ORIENTING DISPLAY" which is herein incorporated by reference in its entirety.

FIELD OF THE INVENTION

The present invention generally relates to displays and more specifically relates to systems and methods that automatically orient displays.

BACKGROUND OF THE INVENTION

Display devices are becoming smaller and more portable. Display devices such as flat liquid crystal displays (LCDs) and plasma displays are relative thin and light weight. These light weight, smaller displays are more easily maneuvered than many of the bulkier cathode ray tube (CRT) displays. Due to the increased maneuverability of these displays, viewers are more likely to turn or rotate the display. This is also applicable to the plethora of available hand held display devices such as personnel digital assistants (PDAs), cell phones, and games, just to name a few. As the cost of these display devices continues to decrease, and the increasing number of smart devices which incorporate these displays increases, more and more users will be using these products to accommodate a variety of needs.

However, a problem with current display devices is that the display image becomes difficult to read/see when the display device is turned or rotated. For example, as a hand held PDA is rotated 90°, the display image appears tilted and can be difficult to interpret, or a viewer watching television may decide to lie down, which also makes the display image on the television appear tilted. Furthermore, some multipurpose devices are better suited to display specific display types in specific formats, such as text in traditional portrait orientation and video in landscape orientation.

A display device which overcomes these problems is desired.

SUMMARY OF THE INVENTION

A method for orienting a display image includes sensing at least one characteristic of an object and determining the orientation of the object from at least one of the sensed characteristic(s). An image display is oriented relative to the determined orientation of the object. A system for implementing this method includes a sensor portion and a display processor. The sensor portion senses at least one characteristic of an object and provides a sensor signal indicative of the characteristic(s). The display processor receives the sensor signal and determines the orientation of the object from the sensor signal. The display processor also orients a display image relative to the determined orientation of the object.

BRIEF DESCRIPTION OF THE DRAWINGS

The foregoing and other objects, aspects and advantages will be better understood from the following detailed description with reference to the drawings, in which:

FIG. 8 is an illustration of a self-orienting display showing a viewer viewing the display image, and multiple sensors positioned on the display device, in accordance with an exemplary embodiment of the present invention;

FIG. 9 an illustration of a self-orienting display showing a viewer viewing the display image, and multiple sensors positioned on the viewer, in accordance with an exemplary embodiment of the present invention;

DETAILED DESCRIPTION OF ILLUSTRATIVE EMBODIMENTS

A self-orienting display in accordance with the present invention senses the orientation of an object and automatically orients a display image in accordance with the orientation of that object. As described herein, self-orienting includes automatically rotating, along any number of axes, and formatting. An exemplary embodiment of this self-orienting display comprises a monitor that automatically orients the display image provided by the monitor to either a landscape orientation or a portrait orientation in response to the orientation of the monitor. However, this is just one of many envisioned embodiments. For example, the display image may be rotated in response to an audio command, such as "rotate", or the display image may be rotated in response to depression of a switch on the display device. Various embodiments of the self-orienting display include various embodiments of the object, the sensors, the format of the display image, and functions performed by the self-orienting display. For example, objects may include the display device that provides the display image, a person viewing the display image, an object within visual and/or acoustic range of the self-orienting display, or a combination thereof. The display device may be any appropriate device having the capability to provide a display image, such as a monitor, a hand held device, a personal digital assistant (PDA), a cellular telephone having a display, a game device having a display, or a portable computer, for example. Various embodiments of sensors include mechanical sensors, electrical sensors, optical sensors, acoustic sensors, gyroscopic sensors, or a combination thereof. Example sensors include mercury switches, infrared detectors, motion detectors, ultrasonic detectors, cameras, and microphones. Furthermore, sensors may be positioned on the display device, a person, or a combination thereof (e.g., mercury switches attached to the display device and gyroscopic sensor attached to a headset of a viewer of the display image). Various embodiments of the display image include graphic display images, textual display images, videos display images, and functional control buttons (e.g., functional displayed representations of control buttons such as play, rewind, stop, scroll), for example. A more detailed description of these various embodiments is provided below.

Figure 1:
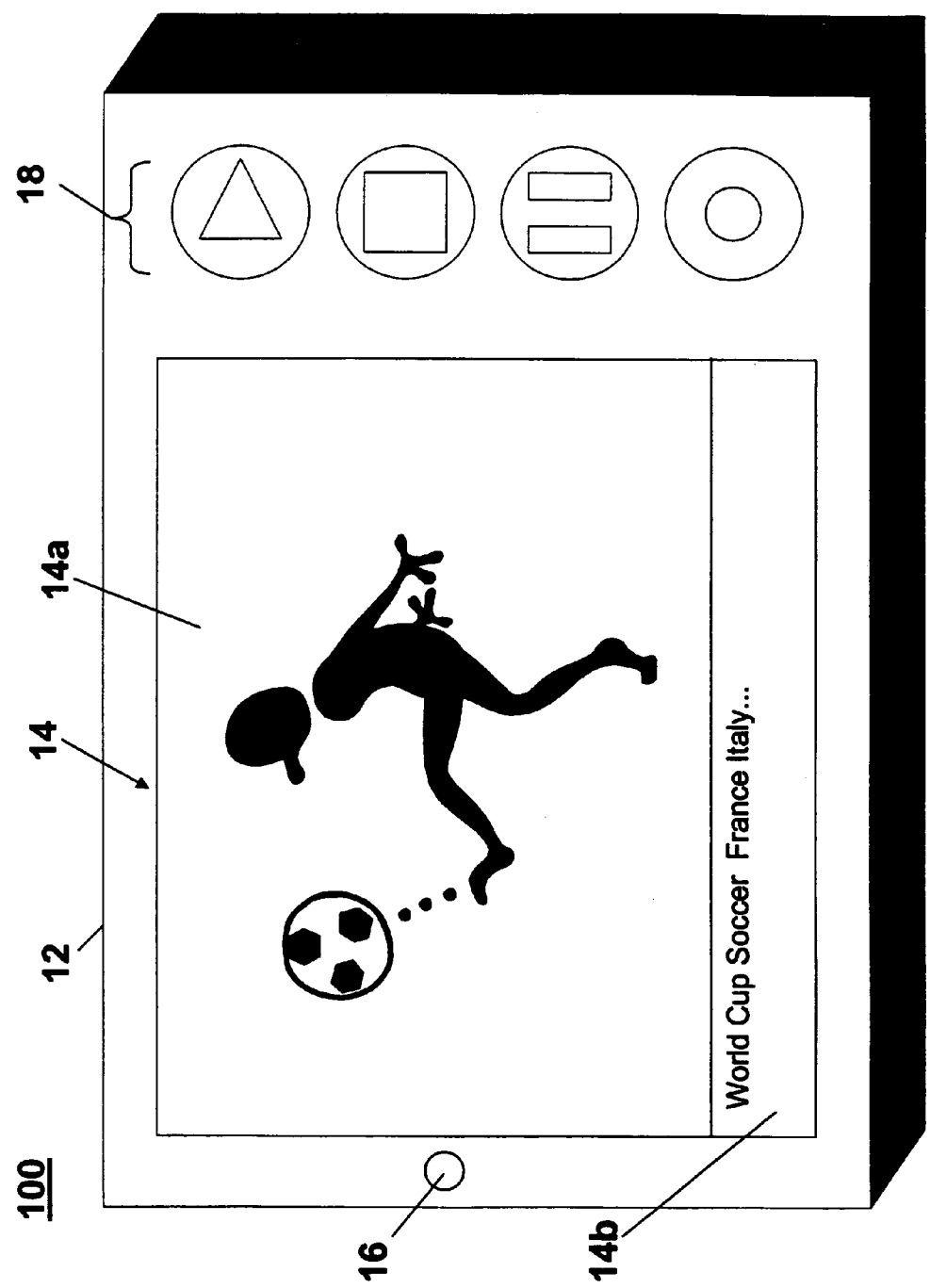
FIG. 1 is an illustration of a self-orienting display comprising a display device, a display image, a sensor, and optional control buttons in accordance with an exemplary embodiment of the present invention.

FIG. 1 is an illustration of a self-orienting display 100 comprising a display device 12, a display image 14, a sensor 16, and optional control buttons 18. The self-orienting display 12 may be in the form of any appropriate display device capable of providing the display image 14. Examples of appropriate display devices 12 include cathode ray tube (CRT) displays, plasma displays, light emitting diode (LED) displays, flat panel displays, projection displays, wireless devices (e.g., cellular devices including telephones, personal digital assistants (PDAs), portable computers; and devices communicating via an optical link, such as an infrared link), hand held devices (e.g., hand held games or game controllers), televisions, radios, or alarm clocks, just to name a few.

The sensor 16 may comprise any type of sensor capable of sensing the orientation of the display device 12 and/or another object (e.g., a person viewing the display image 14). Examples of appropriate sensors include mechanical sensors, electrical sensors, optical sensors, acoustic sensors, gyroscopic sensors, or a combination thereof. Some specific types of sensors 16 include mercury switches, infrared detectors, motion detectors, ultrasonic detectors, cameras, and microphones, or a combination thereof. Note some types of sensors fall into more than one category. For example, a mercury switch may be considered a mechanical sensor and an electrical sensor, or an ultrasonic sensor may be considered an acoustic sensor and an electrical sensor. The sensor 16 may include a single sensor or a plurality of sensors. The sensor 16 may be positioned at various locations on the display device 12 or may be positioned at a single location. For example, sensors 16 may be placed at the corners of the display device 12. Furthermore, sensors 16 may be positioned on the display device, a person, or a combination thereof.

The display image 14 may be in the form of a graphic display image, a textual display image, a video display image, and a functional control button 18, or a combination thereof. The display image 14 may comprise display image portions, such as display image portions 14a and 14b. As depicted in FIG. 1, a graphic/video display type is provided by the display image portion 14a and a text display type is provided by the display image portion 14b. For example, the display image portion 14a may depict a video and the display image portion 14b may depict email headers/text. It is to be understood that this depiction is exemplary, and not intended to be limited thereto. For example, the display image 14 may not be partitioned into portions, the display image 14 may be portioned into a plurality of portions, the display image portions may overlap, the display image portions may provide any combination of display types, or a combination thereof. In some embodiments of the self-orientating display, the control buttons are implemented as display image portions (described in more detail below). It is to be understood, therefore, that reference to display image 14, display image portion 14a, and/or display image portion 14b, may also be appropriately interpreted to refer to the control buttons 18 when implemented as display portions. For example, a description of rotation and formatting techniques to be applied to the display image 14 also applies to the control buttons 18 implemented as display portions.

The control buttons 18 may comprise any appropriate type of control device capable of controlling functions related to the display image 14 and/or the display device 12. In one embodiment, the control buttons 18 comprise liquid crystal display (LCD) buttons with a protective overlay (e.g., a touch switch). In another embodiment, each control button 18 comprises an array of light emitting diodes (LEDs). In yet another embodiment, each control button 18 comprises a thin disc or the like, formed in a desired shape (e.g., triangle) contained within the liquid. In still another embodiment, the control buttons 18 are weighted such that a portion of each button is always oriented towards the greatest gravitation force. The control buttons 18 control various aspects of the display image 14 and/or the display device 12. Functions controlled by the control buttons 18 may include, for example, playback, pause, stop, rewind, enable/disable back lighting, or a combination thereof. Furthermore, the control buttons 18 may include an orientation button that, when activated, orients the display image 14. For example, one of the control buttons 18 may switch the display image 14 between landscape orientation and portrait orientation each time the button is depressed/touched. In another example, the orientation control button may rotate the display image 14 a predetermined number of degrees each time it is depressed/touched. The control buttons 18 are optional. Thus, various embodiments of the self-orienting display in accordance with the present invention may or may not comprise control buttons.

Figure 2B:
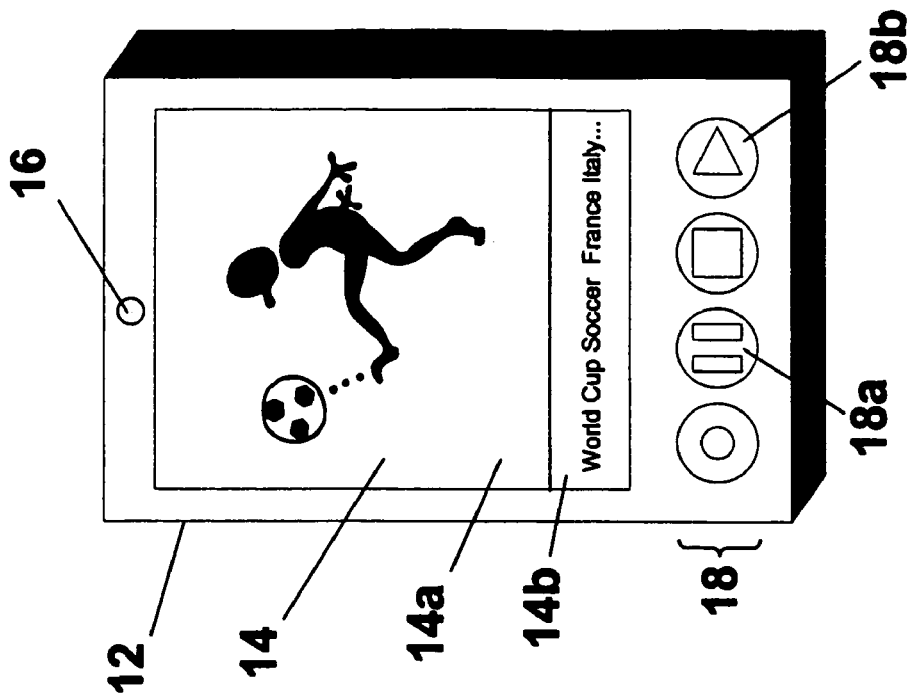
FIG. 2B is an illustration of rotated self-orienting display device showing the oriented display image portions and control buttons in accordance with an exemplary embodiment of the present invention.
Figure 2A:
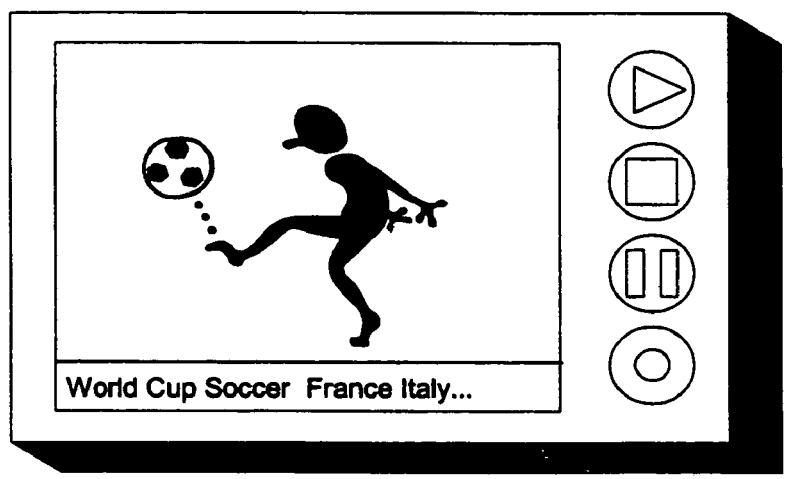
FIG. 2A is an illustration of a rotated display device not possessing a self-orienting capability.

FIG. 2A is an illustration of a rotated display device not possessing a self-orienting capability. FIG. 2B is an illustration of rotated self-orienting display device 12 showing the oriented display image portions 14a, 14b, and control buttons 18. The display devices shown in FIG. 2A and FIG. 2B are rotated 90 degrees with respect to the display device 12 shown in FIG. 1. Comparing FIG. 2A with FIG. 2B, the display image portion 14a of FIG. 2B is rotated by 90° with respect to the equivalent display image portion shown in FIG. 2A. The display image portion 14b of FIG. 2B is also rotated by 90° with respect to the equivalent display image portion shown in FIG. 2A. The control buttons 18 of FIG. 2B are also rotated by 90° with respect to the equivalent control buttons of FIG. 2A. The rotation of the control buttons 18 is most clearly illustrated by comparing buttons 18a and 18b of FIG. 2B with the equivalent control buttons of FIG. 2A. Portions of the display image 14, such as display image portions 14a and 14b, along with the control buttons 18, which may also be a display image portion, are rotated and reformatted to conform to the rotated image space of the display device 12. Rotation and formatting may be accomplished by any appropriate technique. For example, a raster scan display image may be rotated by simply transposing the horizontal and vertical deflection values. Formatting may then be accomplished to fit the rotated image within the available display image space to reduce any distortion. For a display utilizing pixels, each array of pixels may be transposed and formatted. Examples of algorithms/techniques for reformatting displays include scaling, stretching, and the ability to dynamically update resolution.

In one embodiment of the present invention, the display image 14 is oriented with respect to the orientation of the display device 12. As the display device 12 oriented as shown in FIG. 1 is rotated, the display image 14 is automatically oriented, such that the appearance of the display image 14 appears to remain approximately stable regardless of the orientation of the display device 12. Thus, if a viewer prefers landscape mode, she can rotate the display device 12 to achieve the orientation shown in FIG. 1. If the viewer prefers portrait mode, she can rotate the display device 12 to achieve the orientation shown in FIG. 2B. Note that even though the appearance of the display image 14, relative to a viewer, remains approximately constant, the display image 14 is actually oriented (rotated and formatted) in response to the orientation of the display device 12.

In another embodiment, the relative orientation between the display image 14 and a viewer (See FIG. 8 for depiction of a viewer 36) is approximately constant. Thus, if a viewer tilts her head, the display image 14 is tilted in the same direction, such that the orientation between the viewer and the display image 14 is approximately constant (fixed). As shown in FIG. 1 and FIG. 2B, the display image 14 is rotated to achieve a landscape orientation or a portrait orientation. However, orientation of the display image 14 is not limited thereto.

Figure 3:
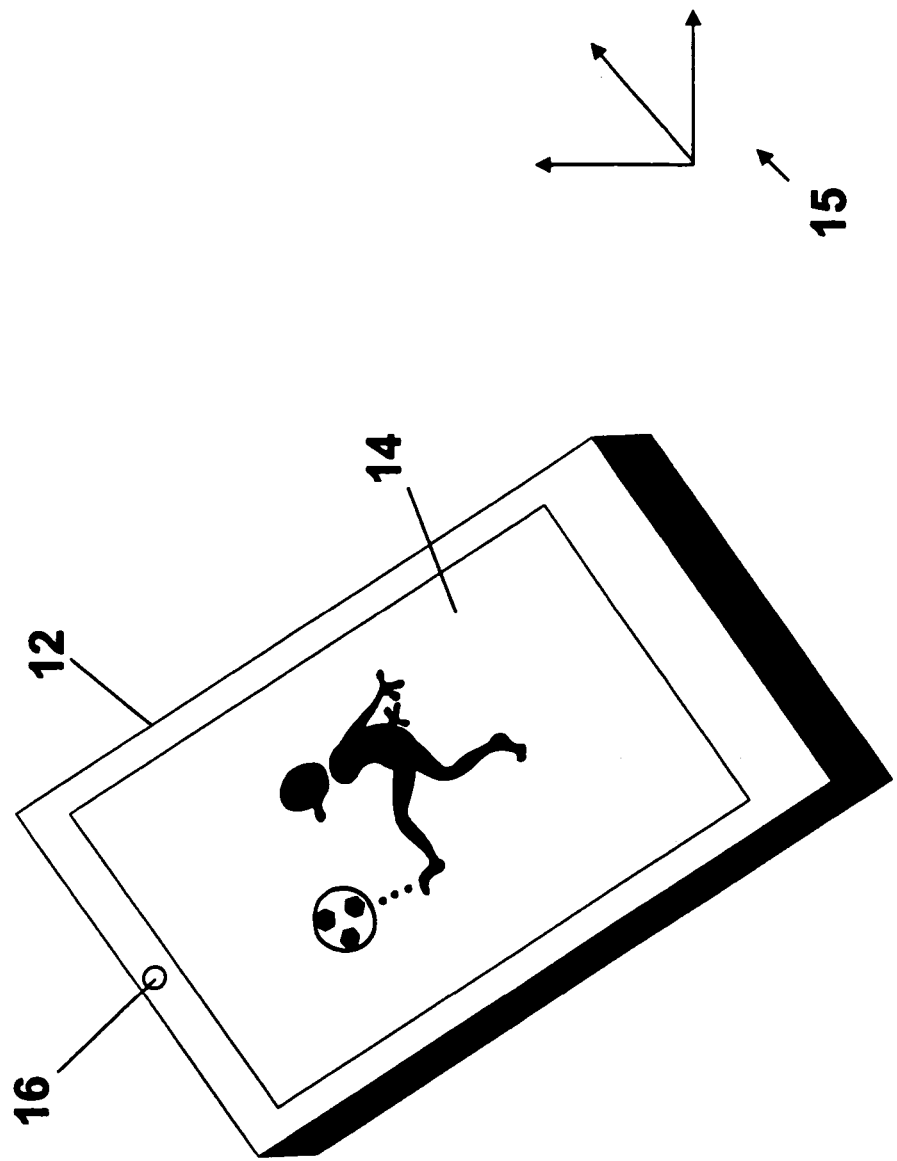
FIG. 3 is an illustration of rotated self-orienting display device showing the oriented display image rotated to achieve an arbitrary orientation in accordance with an exemplary embodiment of the present invention.

FIG. 3 is an illustration of rotated self-orienting display device 12 showing the oriented display image 14 rotated to achieve an arbitrary orientation. The display image 14 of FIG. 3 is automatically rotated such that the relative orientation between a viewer is approximately constant, regardless of the amount by which the display device 12 is rotated. Orientation of the display image 14 and/or the control buttons 18 is not limited to rotation in a single dimension (e.g., plane). The display image 14 may be oriented in one, two, or three dimensions, as indicated by the three dimensional set of axes 15. For example, a three dimensional depiction on the display image 14 may be rotated horizontally, vertically, or a combination thereof as the display device 12 is rotated, such that the relative orientation between a viewer and the display image 14 remains approximately the same.

In another embodiment, the three dimensional display image 14 is oriented to provide a desired perspective to the viewer. This may be accomplished by the viewer simply turning and/or shifting her head to view the desired perspective, turning the display device 12 to view the desired perspective, or a combination thereof. As explained in more detail below, sensors 16 can be positioned on the viewer 36 and/or on the display device 12 to sense the orientation of the viewer and/or display device 12. For example, assume the three dimensional display image 14 is a cube and the display device 12 is a hand held display device. Also assume the viewer is viewing a front side of the cube. If the viewer desires to view the left side of the cube, she may simply rotate the hand held display device (e.g., to the right) to view the left side of the cube. She may also turn her head (e.g., to the right and/or shift her head to the left), as if the cube were physically in front of her and she positioned herself to look at the left side.

Figure 4:
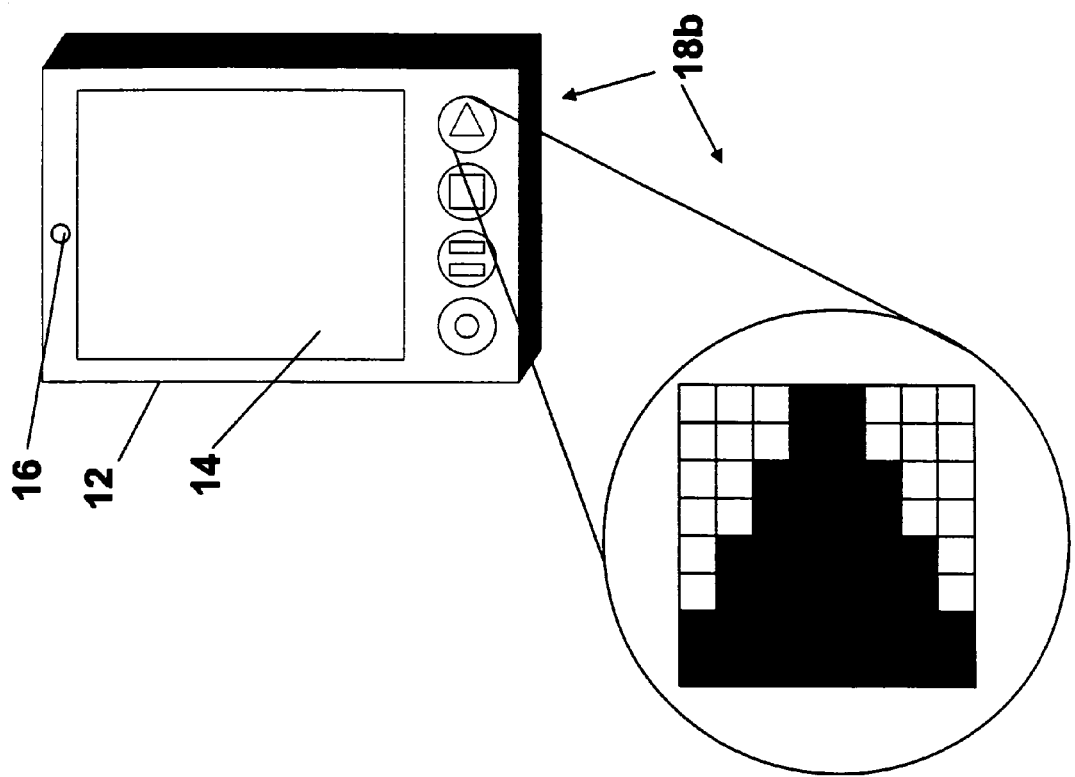
FIG. 4 is an enlarged illustration of a control button comprising an array of light emitting diodes (LEDs) in accordance with an exemplary embodiment of the present invention.

As mentioned above, various embodiments of the control buttons 18 are envisioned. FIG. 4 is an enlarged illustration of a control button 18b comprising an array of light emitting diodes (LEDs). An exemplary control button 18b is expanded to show the array of LEDs utilized to display the shape corresponding to the control function performed by the button. The control button 18b comprises a triangle shaped image, which may signify play, for example. The LEDs may be various colors. Upon the orientation of the display device 12 being sensed, the image of control buttons 18, including 18b, are rotated accordingly. In one embodiment, the array of LEDs is symmetric, thus allowing the control button image to be rotated between landscape and portrait mode by transposing the array of LEDs.

Figure 5:
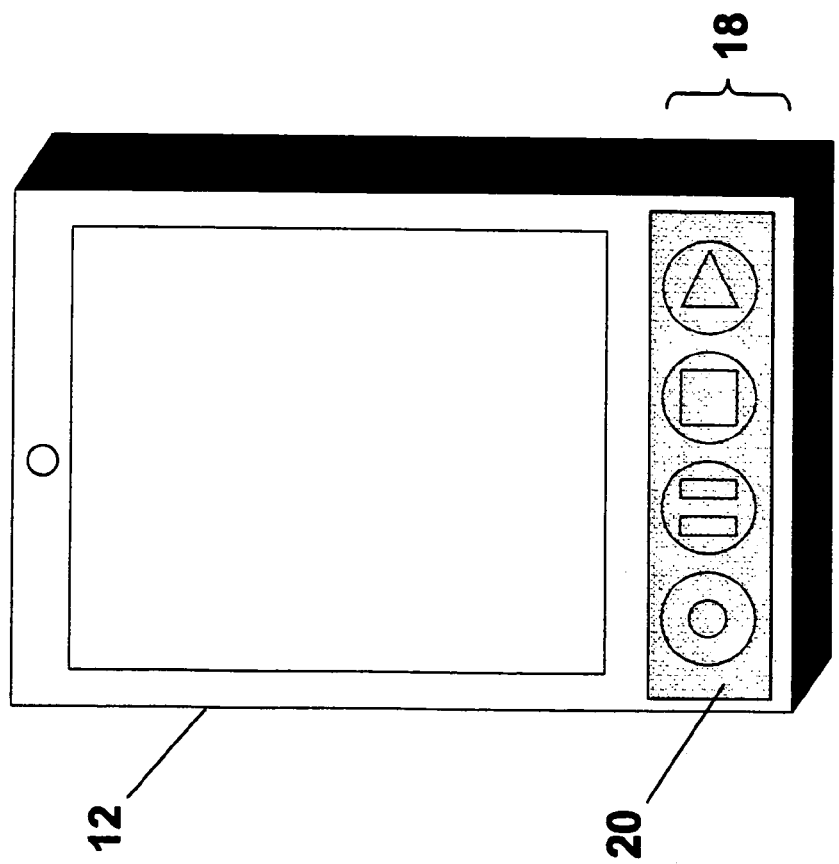
FIG. 5 is an illustration of liquid crystal display (LCD) control buttons in accordance with an exemplary embodiment of the present invention.

FIG. 5 is an illustration of liquid crystal display (LCD) control buttons 18. The control buttons 18 in FIG. 5 comprise LCD portions for displaying the shape corresponding to the control function performed by the button. As shown in FIG. 5, the LCD portions are covered with an appropriate overlay 20 to protect the LCD portions and to provide a surface which can be touched/depressed to utilize the control buttons 18. Upon the orientation of the display device 12 being sensed, the LCD image of control buttons 18 are rotated accordingly.

Figure 6:
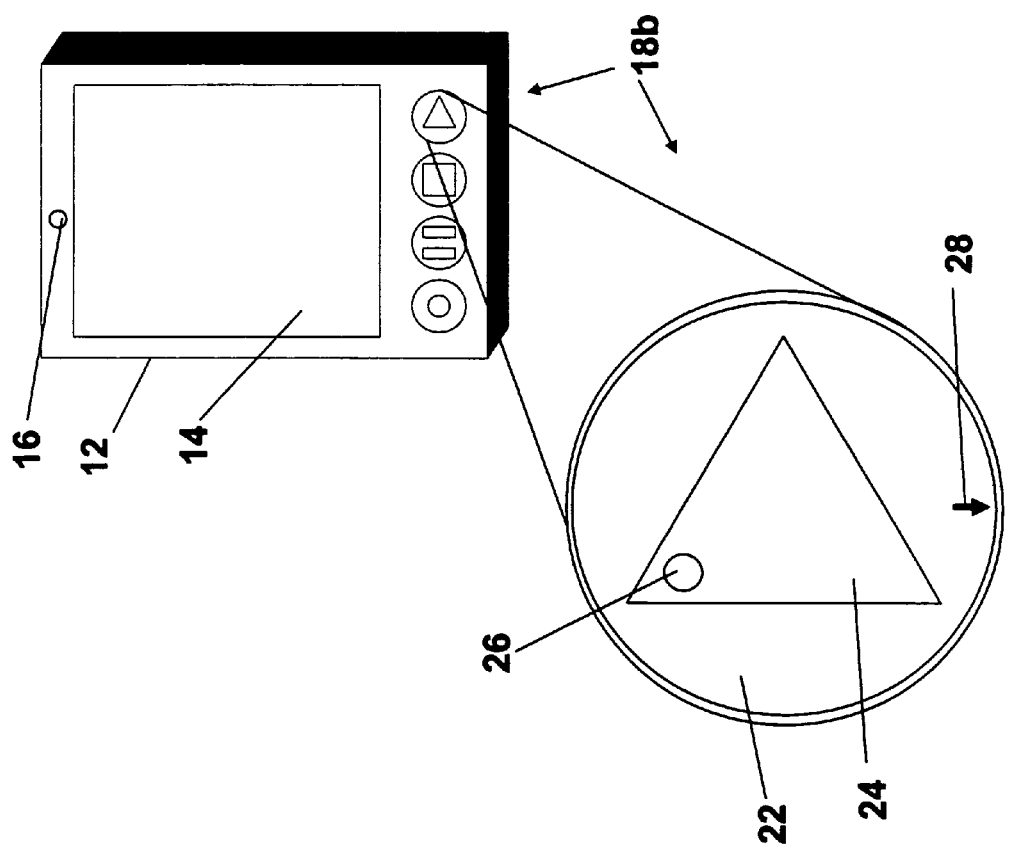
FIG. 6 is an enlarged illustration of a control button that is automatically oriented by gravity in accordance with an exemplary embodiment of the present invention.

FIG. 6 is an enlarged illustration of a control button 18b that is automatically oriented by gravity, wherein the control button comprises a liquid portion 22 having a shaped disc 24 contained therein. The exemplary control button 18b is automatically oriented by gravity when the display device 12 is rotated. The control button 18b of FIG. 6 comprises a liquid portion 22 contained within the control button 18b. Within the liquid portion 22 is contained disc 24 formed in a shape corresponding to the control function performed by the button. The disc 24 is triangular shaped, indicating the play function, for example. The disc 24 is suspended in the liquid portion 22. As the display device 12 is rotated the disc 24 automatically rotates, thus resulting in self-orientation of the control button 18b. In one embodiment, the disc 24 is weighted such that a specific portion 28 of the disc 24 is always pointed in the direction of the strongest gravitational pull (e.g., down). The arrow 28 depicts a portion of the disc 24 that is heavier (more mass) such that the portion 28 is always facing "down" (toward the strongest gravitational attractive force). In another embodiment, the disc 24 contains an air bubble 26 (or other appropriate gas of liquid portion) such that the portion with the lesser mass is always facing "up" (away from the direction of the strongest gravitation pull). The bubble 26 may be any portion comprising a gas or a liquid that is less dense than the liquid in the liquid portion 22. Other types of control buttons 18 that are automatically oriented by gravity are envisioned.

Figure 7:
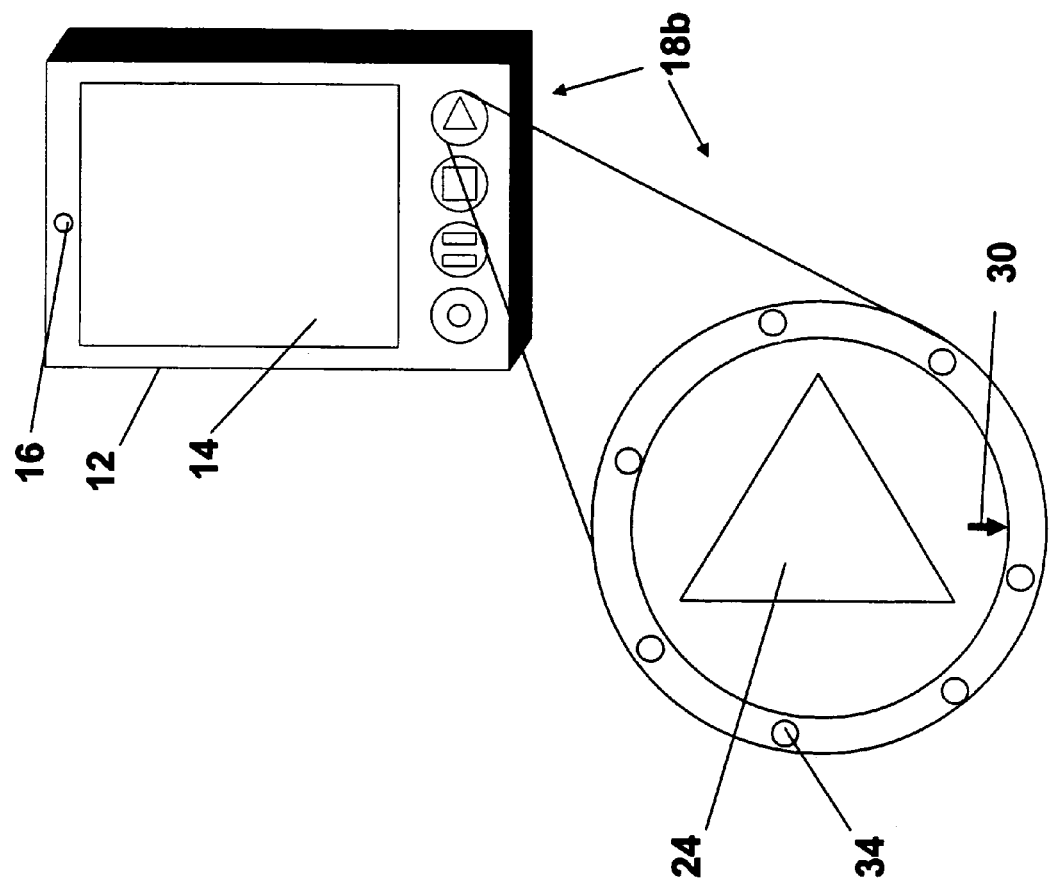
FIG. 7 is an enlarged illustration of a control button that is automatically oriented by gravity in accordance with another exemplary embodiment of the present invention.

FIG. 7 is an enlarged illustration of a control button 18b that is automatically oriented by gravity, wherein the control button 18b comprises bearing 34. Self-orientation of the control button 18b of FIG. 7 is achieved via gravity in a similar manner as described above with respect to FIG. 6. However, the disc 24 is contained within the control button 18b by bearings, or the like, which allow the disc 24 to freely rotate. Again the control button 18b shown in FIG. 7 may comprise a weighted portion 28, a less dense portion 26, or a combination, similar to the control button 18b shown in FIG. 6. Also, other mechanisms for providing a self-orienting display that is automatically oriented via gravity. For example, the control buttons 18 may be attached to spindles or axles that allow the control buttons 18 to freely rotate.

FIG. 8 is an illustration of a self-orienting display showing a viewer 36 viewing the display image 14, and multiple sensors 16a, 16b, and 16c positioned on the display device 12. As mentioned above, the sensors 16 may comprise any appropriate type and combination of sensors capable of sensing the orientation of an object. Examples of which include known types of devices such as mercury switches, gyroscopic sensors/devices, gravity switches/devices, optical detectors (e.g., infrared detectors), acoustic sensors/devices (e.g., ultrasonic devices, acoustic microphones), electrical sensors/devices, magnetic devices/sensors, and cameras. The sensors 16 may be positioned on the display device 12 and/or on the viewer 36. Thus, the sensors 16 may be positioned on an object, wherein the object may comprise the display device 12, the viewer 36, another object within sensing range of the sensors 16, or a combination thereof.

For purposes of explaining the following exemplary embodiment, the sensors 16 positioned on the display device 12 in FIG. 8 are a camera 16*a*, an acoustic sensor (e.g., microphone) 16*b*, and mercury switches 16*c*. The camera 16*a* may comprise any appropriate type of camera, such as a camera utilizing a charge coupled device (CCD), or an infrared camera (e.g., night vision), for example. The camera 16*a* senses the orientation of the viewer's 36 head. In response to the sensed orientation of the viewer's 36 head; the display image 14 is automatically oriented by any of the techniques/devices described herein.

To facilitate automatic self-orientation, in one embodiment, the relative orientation between the display image 14 and the object is initialized. This may include initialization of the relative orientation between the display image 14 and the display device 12, the relative orientation between the display image 14 and the viewer 36, or a combination thereof. For example, the relative orientation between the viewer 36 and the display image 14 is initialized. To generate the initial relative orientation, the viewer 36 may position herself in front of the display image 14, such that she is within sensing range of the sensors 16 (e.g., optical range of the camera 16*a* and/or audio range of the microphone 16*b*). While observing her depiction on the display image 14, the viewer may position her head to align the depiction to be centered in the display image 14, for example. Once the viewer is satisfied that the relative orientation is as desired, she may initialize this relative orientation. All subsequent automatic orientation will be with respect to the initial relative orientation. Initialization may be accomplished by any appropriate means, such as activating a switch, depressing a button (e.g., a control button 18), giving an audible command, waiting a period of time, or a combination thereof. In one exemplary embodiment, the viewer gives an audio command, such as "align". The microphone 16*b* receives this audio command, and transduces the audio command into a sense signal. This sense signal is utilized to establish the baseline relative orientation between the display image 14 and the viewer 36. Thus, the viewer 36 may rotate the display device 12 to either landscape of portrait orientation. The mercury switches 16*c* senses the orientation of the display device 12, also providing a sense signal. The sense signal provided by the mercury switches 16*c* and the sense signal provided by the camera 16*b* during initialization are utilized to establish the baseline relative orientation. The sense signals are also utilized to orient the display image 14 as the display device 12 and/or the viewer 36 change orientation. Also, the display image 14 may be oriented via an audio command, such as "rotate", in response to which the display image 14 is rotated (e.g., 90°). It is to be understood that various combinations of sensors 16, and placements thereof are envisioned. For example, as shown in FIG. 9, sensors 16 may be positioned on the viewer 36.

In yet another embodiment, the viewer 36 is authenticated. Authentication may be accomplished by analyzing the sensed image, which is sensed by the camera 16*b*, to determine if the viewer is authorized to use the display device 12. The sensed image may include a retinal scan, a finger print scan, or the like. The sensed image is analyzed to determine if authorization is appropriate. Any appropriate technique may be utilized to analyze the sensed image. For example, the sensed image may be compared to a stored representation of an authorized image, or the sensed image may be analyzed for key features which distinguish an authorized sensed image, or a combination thereof. In another embodiment, the viewer is authenticated by analyzing a sensed acoustic signal received by the acoustic sensor 16*c*. The acoustic signal may include a key phrase, such as the viewer's 36 name or a password. The sensed acoustic signal is analyzed to determine if authorization is appropriate. Any appropriate technique may be utilized to analyze the sensed acoustic signal. For example, the sensed acoustic signal may be compared to a stored representation of an authorized acoustic signal, or the sensed acoustic signal may be analyzed for key features which distinguish an authorized sensed acoustic (e.g., acoustic signature), or a combination thereof.

Figure 10:
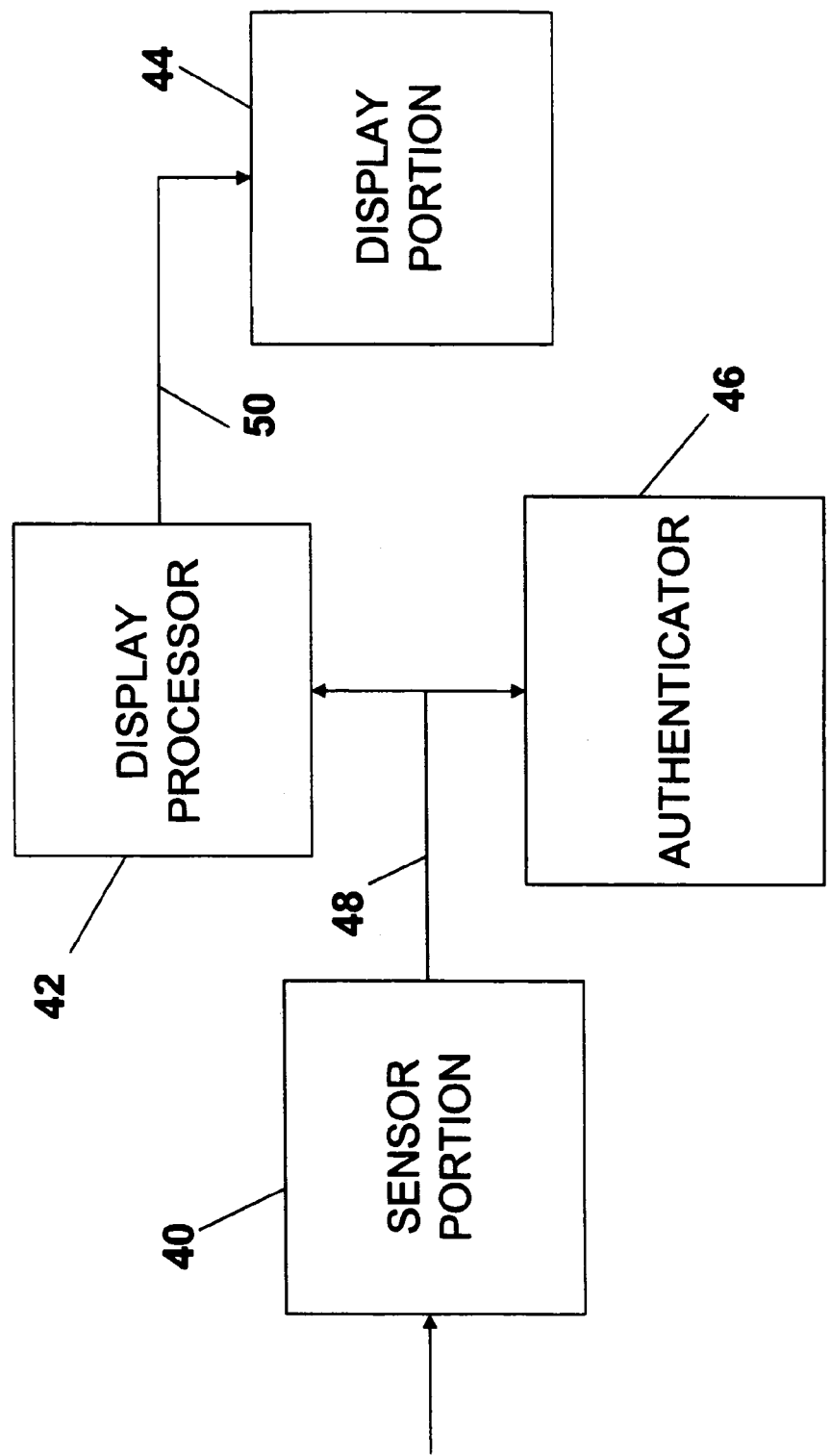
FIG. 10 is a functional block diagram of self-orienting display system comprising a sensor portion, a display processor, a display portion, and an authenticator, in accordance with an exemplary embodiment of the present invention.

FIG. 10 is a functional block diagram of self-orienting display system comprising a sensor portion 40, a display processor 42, a display portion 44, and an optional authenticator 44. The sensor portion 40 may comprise any combination of the sensors described above. The sensor portion 40 senses at least one characteristic of an object. For example, the object may be the display device (e.g., display device 12) and characteristics may include orientation of the display device; the object may be a user (e.g., viewer 36) and the characteristic may include an image of a portion of the user's body (e.g., retina, finger print); the object may be a user and the characteristic may include a acoustic signal provided by the user (e.g., voice), or a combination thereof. The sensor portion 40 provides a sensor signal 48 indicative of the sensed characteristic (or characteristics) of the object. The display processor 42 receives the sensor signal 48 and processes the sensor signal 48 to determine the orientation of the sensed characteristic(s). The display processor 42 provides an orientation signal 50 indicative of the sensed characteristic(s). The display portion 44 (e.g., the display device 12) receives the orientation signal 50 and orients a display image (e.g., display image 14) in accordance with the determined orientation. In one embodiment, the self-orienting display system comprises the authenticator 46 for authenticating the object by analyzing the sensed characteristic(s) of the object. The authenticator 46 receives the sensor signal 48 and analyzes the sensed characteristic(s) using any of the analysis techniques described above. This sense signal 48 and the orientation signal 50 may be provided by any appropriate means, such as electrically, acoustically, optically, electromagnetically, or a combination thereof.

Figure 11:
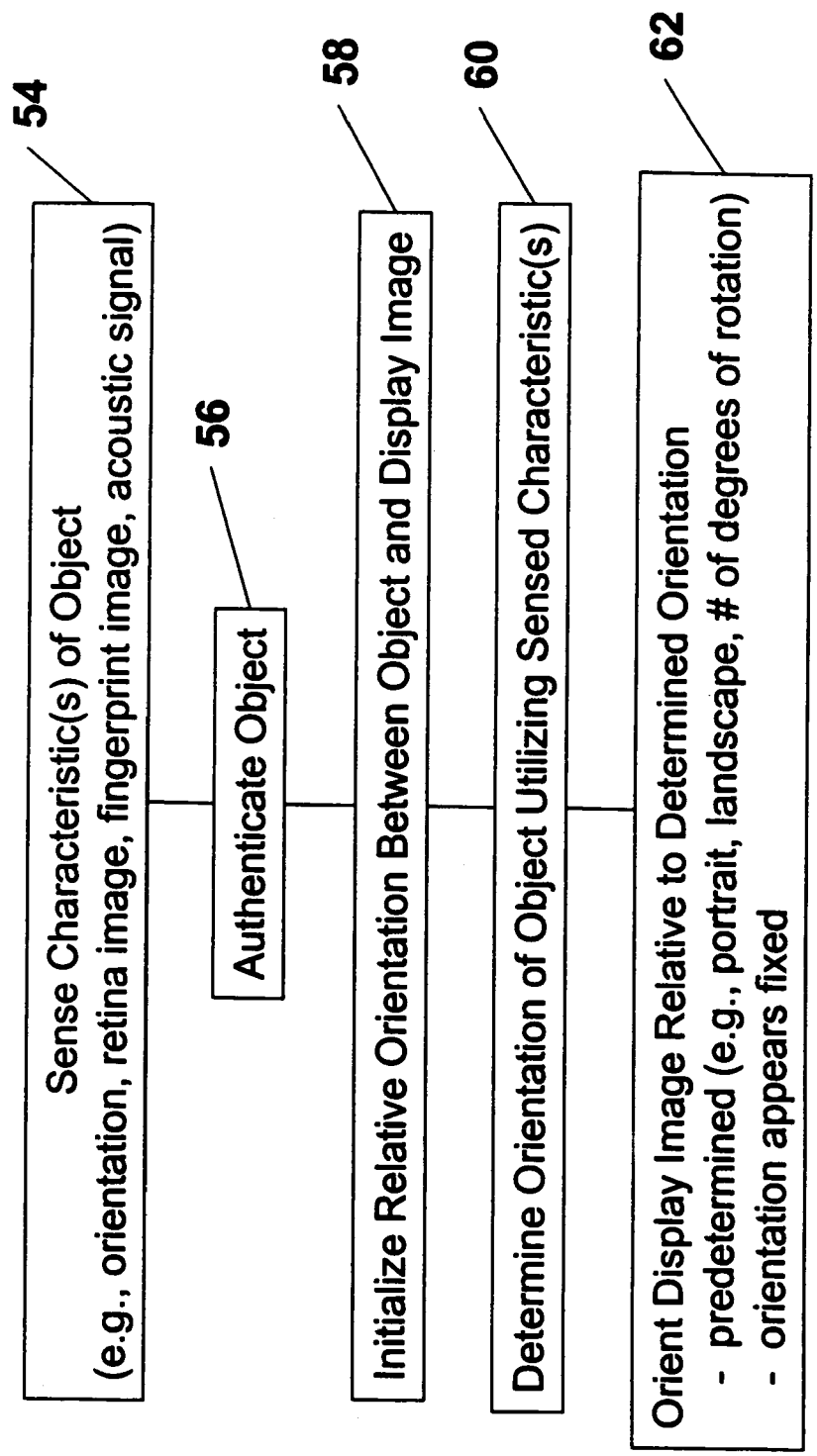
FIG. 11 is a flow diagram of an exemplary process for orienting a display in accordance with an exemplary embodiment of the present invention.

FIG. 11 is a flow diagram of an exemplary process for self-orienting a display. The object is sensed at step 54. As described above, the object may be a person, the display device, or a combination thereof. The characteristic may include orientation of the object, an image of a portion of the object (e.g., retina or fingerprint), an acoustic signal (e.g., voice or clap), or a combination thereof. The object may be sensed by any combination of the sensors described above, such as optical sensors, mechanical sensors, gravity sensors, gyroscopic sensors, electromagnetic sensors, acoustic sensors, touch sensitive sensors (e.g., control buttons 18), for example. At step 56, the object is authenticated as described above. The step of authentication is optional. The relative orientation between the object and the display image is initialized at step 58. The step of initialization is also optional. Initialization may be accomplished described above. At step 60, the orientation of the object is determined utilizing the sensed characteristic (or characteristics) of the object. The display image is oriented with respect to the determined orientation of the object at step 62. As described above, the display image may be oriented to predetermined orientations, such as portrait, landscape, rotation in a predetermined number of degrees, or a combination thereof. The display image may also be oriented such that the orientation of the display image appears approximately constant (e.g., fixed) regardless of the orientation of the object. For example, a display image will appear to rotate and/or tilt in the opposite direction of the rotation and/or tilt of the display device.

A method for self-orienting a display image as described herein may be embodied in the form of computer-implemented processes and system for practicing those processes. A method for self-orienting a display image as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for self-orienting a display image as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

Although illustrated and described herein with reference to certain specific embodiments, the system and method for orienting a display as described herein are nevertheless not intended to be limited to the details shown. Rather, various modifications may be made in the details within the scope and range of equivalents of the claims and without departing from the spirit of the invention.

What is claimed:

1. A computer-implemented method for orienting a display image for providing a viewing perspective to a viewer, said method comprising:
   determining a first orientation of an object, wherein said object comprises a display device for rendering said display image;
   determining a second orientation of said object; and
   continuously rotating said display image if said first orientation of said object differs from said second orientation of said object and the object is not in motion, wherein:
      the display image is continuously rotated about an axis while maintaining a constant angle between the axis and a viewing perspective of the viewer; and
      the display image continues to rotate until the first orientation and the second orientation do not differ.

2. A computer-implemented method in accordance with claim 1, further comprising:
   maintaining an orientation of said display image if said first orientation of said object is the same as said second orientation of said object.

3. A computer-implemented method in accordance with claim 1, further comprising:
   re-determining an orientation of said object;
   continuously orienting said display image if said re-determined orientation of said object differs from a preceding determined orientation of said object; and
   maintaining an orientation of said display image if said re-determined orientation of said object is the same as said preceding determined orientation of said object, wherein said maintained orientation is indicative of an orientation of said display image when said orientation of said object is re-determined.

4. A computer-implemented method in accordance with claim 1, further comprising:
   orienting said display image to a predetermined orientation if said first orientation of said object is the same as said second orientation of said object.

5. A computer-implemented method in accordance with claim 1, wherein said object comprises said viewer.

6. A computer-implemented method in accordance with claim 5, wherein said first and second orientations of said viewer are indicative of first and second respective positions of a body part of said viewer.

7. A computer-implemented method in accordance with claim 6, wherein said body part comprises a head of said viewer.

8. A computer-implemented method in accordance with claim 1, further comprising:
   orienting said display image in approximately a same direction as a direction of motion of said object when moving from said first orientation to said second orientation.

9. A computer-implemented method in accordance with claim 1, further comprising:
   orienting said display image in approximately an opposite direction as a direction of motion of said object when moving from said first orientation to said second orientation.

10. A computer-implemented method in accordance with claim 1, wherein said display image is capable of being oriented in less than 90 degree increments.

11. A computer-implemented method in accordance with claim 1, wherein orientation of said object is determined via at least one of a magnetic sensor, a gyroscopic sensor, an acoustic sensor, a mechanical sensor, a mercury switch, an optical sensor, and an image sensor.

12. A system for orienting a display image for providing a viewing perspective to a viewer, said method comprising:
   a display processor for:
      determining a first orientation of an object;
      determining a second orientation of said object; and
      continuously rotating said display image if said first orientation of said object differs from said second orientation of said object and the object is not in motion, wherein:
         the display image is continuously rotated about an axis while maintaining a constant angle between the axis and a viewing perspective of the viewer; and
         the display image continues to rotate until the first orientation and the second orientation do not differ.

13. A system in accordance with claim 12, said display processor further:
   maintaining an orientation of said display image if said first orientation of said object is the same as said second orientation of said object.

14. A system in accordance with claim 12, said display processor further:
   re-determining an orientation of said object;
   continuously orienting said display image if said re-determined orientation of said object differs from a preceding determined orientation of said object; and
   maintaining an orientation of said display image if said re-determined orientation of said object is the same as said preceding determined orientation of said object, wherein said maintained orientation is indicative of an orientation of said display image when said orientation of said object is re-determined.

15. A system in accordance with claim 12, said display processor further:
   orienting said display image to a predetermined orientation if said first orientation of said object is the same as said second orientation of said object.

16. A system in accordance with claim 12, wherein said object comprises said viewer.

17. A system in accordance with claim 16, wherein said first and second orientations of said viewer are indicative of first and second respective positions of a body part of said viewer.

18. A system in accordance with claim 17, wherein said body part comprises a head of said viewer.

19. A system in accordance with claim 12, wherein said object comprises a display device for rendering said display image.

20. A system in accordance with claim 12, said display processor further:
   orienting said display image in approximately a same direction as a direction of motion of said object when moving from said first orientation to said second orientation.

21. A system in accordance with claim 12, said display processor further:
   orienting said display image in approximately an opposite direction as a direction of motion of said object when moving from said first orientation to said second orientation.

22. A system in accordance with claim 12, wherein said display processor is capable of orienting said display image in less than 90 degree increments.

23. A system in accordance with claim 12, wherein orientation of said object is determined via at least one of a magnetic sensor, a gyroscopic sensor, an acoustic sensor, a mechanical sensor, a mercury switch, an optical sensor, and an image sensor.

24. A computer readable storage medium encoded with a computer program code for providing a viewing perspective to a viewer, said program code comprising:
   a first determination code segment for determining a first orientation of an object;
   a second determination code segment for determining a second orientation of said object; and
   an orient code segment for continuously rotating said display image if said first orientation of said object differs from said second orientation of said object and the object is not in motion, wherein:
      the display image is continuously rotated about an axis while maintaining a constant angle between the axis and a viewing perspective of the viewer; and
      the display image continues to rotate until the first orientation and the second orientation do not differ.

25. A computer readable storage medium in accordance with claim 24, said program code further comprising:
   a maintain code segment for maintaining an orientation of said display image if said first orientation of said object is the same as said second orientation of said object.

26. A computer readable storage medium in accordance with claim 24, said program code further comprising:
   a re-determination code segment for re-determining an orientation of said object;
   a re-determine orient code segment for continuously orienting said display image if said re-determined orientation of said object differs from a preceding determined orientation of said object; and
   a re-determine maintain code segment for maintaining an orientation of said display image if said re-determined orientation of said object is the same as said preceding determined orientation of said object, wherein said maintained orientation is indicative of an orientation of said display image when said orientation of said object is re-determined.

27. A computer readable storage medium in accordance with claim 24, said program code further comprising:
   a predetermine orientation code segment for orienting said display image to a predetermined orientation if said first orientation of said object is the same as said second orientation of said object.

28. A computer readable storage medium in accordance with claim 24, wherein said object comprises said viewer.

29. A computer readable medium in accordance with claim 28, wherein said first and second orientations of said viewer are indicative of first and second respective positions of a body part of said viewer.

30. A computer readable storage medium in accordance with claim 29, wherein said body part comprises a head of said viewer.

31. A computer readable storage medium in accordance with claim 24, wherein said object comprises a display device for rendering said display image.

32. A computer readable storage medium in accordance with claim 24, wherein said display image is oriented in approximately a same direction as a direction of motion of said object when moving from said first orientation to said second orientation.

33. A computer readable storage medium in accordance with claim 24, wherein said display image is oriented in approximately an opposite direction as a direction of motion of said object when moving from said first orientation to said second orientation.

34. A computer readable storage medium in accordance with claim 24, wherein said display image is capable of being oriented in less than 90 degree increments.

35. A computer readable storage medium in accordance with claim 24, wherein orientation of said object is determined via at least one of a magnetic sensor, a gyroscopic sensor, an acoustic sensor, a mechanical sensor, a mercury switch, an optical sensor, and an image sensor.

* * * * *